Nov. 14, 1961 — T. S. TRZYNA ET AL — 3,008,197
GLAZING
Filed Feb. 16, 1959

INVENTORS.
THADDEUS STEPHEN TRZYNA
FRANCIS G. FIRTH
BY White & Haefliger
ATTORNEYS.

United States Patent Office 3,008,197
Patented Nov. 14, 1961

3,008,197
GLAZING
Thaddeus Stephen Trzyna, 1840 Laurel St., South Pasadena, Calif., and Francis G. Firth, 3221 Barry Ave., Los Angeles, Calif.
Filed Feb. 16, 1959, Ser. No. 793,459
10 Claims. (Cl. 20—56.5)

This invention relates generally to the installation of window panels in many different types of applications and particularly in instances where double or multiple windows are desirable. More specifically, the invention has to do with temperature insensitive and fluid leak proof window and frame joints in multiple window combinations, which are very advantageously adapted for use in applications subject to severe operating conditions, such as wide temperature changes, and fluid pressure variations at opposite sides of the windows.

The problem with which the invention is concerned is one illustrated most conveniently by what has been found to happen to windows on aircraft, particularly jet aircraft, which are subjected to wide temperature differences and pressure changes. For example, such windows have in the past been pressure set in elastomer or rubber cushions carried by metallic window frames. Experience has shown that the rubber cushions become extremely rigid at low temperatures ranging down to minus 100° F. at extreme altitudes, resulting in pressure leaking at the window joint and in extreme cases blowing out of the window. Also at extremely high desert temperatures and with ultra violet exposure on deserts, the rubber is apt to deteriorate, swell, crack or otherwise to become incapable of holding pressure. Another problem has to do with large differential expansion between the frame and glass over wide temperature ranges, prohibiting close tolerances.

In an effort to solve the above problems, it has been proposed to perforate or punch holes in the edge portion of the window to provide attachment means acting to hold the window in place under all conditions. However, laminated window structures or assemblies have become preferred especially on jet aircraft, for purposes of increased strength, and freedom from shattering, and such laminates cannot be edge perforated or punched. The use of adhesives in place of the rubber cushion for bonding the frame to the window panel has been tried, but these have failed to hold pressure under extreme temperature changes because of differential expansion as previously mentioned. Finally, thought has been given to eliminating the adhesive and rubber cushion, and in place thereof to effect a direct heat seal between the frame and the window panel. However, when the panel is of a laminated assemblage, the heat sealing process acts detrimentally upon the plastic sheet insert within the laminated assemblage, so that this method of effecting a leak proof joint has been found impractical.

The present invention constitutes a solution to the problems discussed above particularly in multiple window applications, in that the window and frame joints are made pressure leak proof and temperature insensitive no matter what the window panel design may be, as for example either a solid transparent panel such as glass, or a laminated structure including plastic sheets intermediate pairs of parallel glass sheets. In particular the invention contemplates the provision of a pair of transparent window panels, frame structure holding the panels in spaced apart relation and mounting the panels at their peripheries, the frame structure including pairs of strip flanges overlapping the panels at opposite sides thereof, and an adhesive bonding agent or sealant holding the strip flanges to the panels in fluid leak proof condition.

The latter condition is maintained under wide temperature changes of the joints by virtue of the fact that the strip flanges and panel bonded thereto have essentially the same temperature coefficient of expansion so as to preclude rupture of the adhesive or other sealant and resultant pressure leakage through the joint.

As a result there is no relative expansion or displacement between the frame and window panel destructive of the adhesive or sealant, in spite of wide temperature changes to which the joint is subjected. Therefore, there is no danger of the window and frame joint leaking pressure, or the window blowing out or in.

Other advantages characteristic of the window and frame joint construction include the provision of a tab connection made integral with the frame in such manner that the structural components may be extruded or roll formed from metal strip and then joined together as by welding or other techniques such as adhesive bonding. The tab itself can then be connected to other structure as by welding, riveting, bonding and screwing the latter facilitating rapid replacement of the window and frame simply by detachment of the tab from the mounting structure, obviating laborious setting of a new glass pane in the frame channel itself. The tab connection can therefore consist of a metal or alloy different from the channel embracing the window panel, and may be in the form of an expansion joint.

Thus, while the frame channel may consist of the alloy known as Kovar, the tab attached to the Kovar channel may comprise aluminum, titanium, steel, or laminated fiberglass to name a few, since only the frame channel need have a temperature coefficient of expansion matching that of the glass panel. Of particular advantage in this respect is a ferrous tab welded to a Kovar frame channel, the tab being capable of brazing, soldering, and adhesive bonding to mounting structure consisting of polymer plastic material, brass, aluminum and other metals.

Other objects and advantages of the invention, as well as the details of an illustrative embodiment, will be more fully understood from the following detailed description of the drawings, in which.

Figure 1:
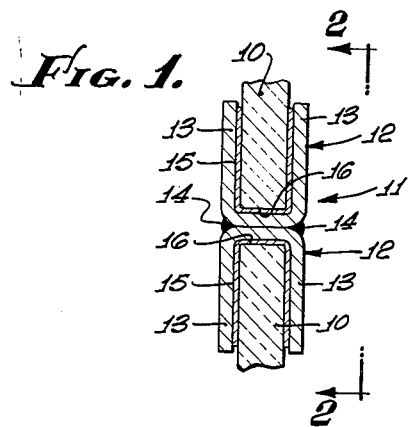
FIG. 1 is an enlarged cross section through a typical multiple joint of the invention.

Referring first to FIG. 1, the window panels are indicated at 10, and typically comprise glass. Frame structure holding the panels in spaced apart relation and mounting them at their peripheries generally indicated at 11, the frame structure including channels 12 having pairs of strip flanges 13 at opposite outer sides of the panels. The channels extend in back-to-back relation and are suitably joined as by the welding shown at 14, so that the strip flanges 13 on the panels extend oppositely.

The channeled frame structure is bonded to the window panels by means of adhesive bonds indicated at 15 as extending completely about the peripheries 16 of the window panels and at opposite sides thereof. It will also be understood that a sealant may be used in place of an adhesive substance, the sealant blocking escape of fluid or pressure through the joint. For example, differential pressure conditions may exist at opposie sides of the joint structure of FIG. 1. Either the adhesive or sealant will maintain the joint in pressure leak proof condition throughout wide temperature changes since according to the invention the frame structure 11 and the window panels 10 have the same temperature coefficient of expansion so as to preclude rupture of the adhesive or sealant with resultant pressure leakage through the joint. Alternately, different window panels 10 may have different temperature coefficients of expansion, but in that event the channels mounting the different window panels will have different temperature coefficients matching their respective window panel coefficients of expansion.

Typical window panels will comprise glass containing fused silica and sodium oxide together with other ingredients such as oxides of boron, calcium, aluminum, and mercury, the glasses themselves being known as quartz glass, Pyrex and Vycor, for example. While the window panel may comprise a pair of glass sheets with a thin shock resistant plastic sheet therebetween, as for example a pyroxylin plastic sheet, it is contemplated that single pane glazing can be used, as for oven windows, vacuum furnaces, periscopes, military glazing, environment chambers, underwater glazing, lamps, searchlights and architectural or decorative structures subject to contact by corrosive or toxic gases. In the latter event, Pyrex, Vycor or quartz glass constitute typical glazing materials and will be sealed into the matching temperature coefficient frame with an inorganic seal material.

Typical metal alloys suitable for use as frames by virtue of characteristic matching temperature coefficients of expansion include the commercial products known as Sealmet or Kovar. Metal alloys containing 35-54% iron, 25-45% nickel, 18-53% cobalt and 9-10% chromium, with or without addition of minor amounts of other metals can be made so as to have temperature coefficients of expansion substantially matching the expansion coefficients of glasses selected, over the operating temperature range.

As for the sealant or adhesive agent for bonding the glass panel to the frame, an epoxide resin is of particular value and is preferred in most instances because it possesses a very high adhesive strength, on the order of 2000 p.s.i. in lap shear as respects the bond to both glass and metal. Also, this thermosetting has the distinct advantage of being curable at low temperatures, for example around 200° F., which is not detrimental to the plastic sheet insert between glass panes. The compositions of such resins are described fully in booklet SC-54-57 published by the Shell Chemical Company and entitled "The Use of Epon Resins in Adhesive Applications."

A further advantage of epoxide resin adhesives is their property of curing with substantially no shrinkage, due to the absence of solvents. Also, since no plasticizers are added, the strength of the resin and bond actually increases with decreasing temperatures, dropping to as low as −100° C. The epoxy is a dense polymer with no porosity, and is therefore impenetrable by gases. It is also unaffected by water, ice, solvents and ultra violet light.

Other seal materials contemplated include organo-inorganic polymer silicones, fluorinated polymers, low melting point metal alloys such as type metal, lead, and zinc alloys which can be cast into the joint. Another suitable seal consists of an inorganic silicate composition such as a combination of asbestos and sodium silicate, a commercial example of which is known as "Sauresin." Low melting point lead and tin alloys and dental filling alloys are also usable for joint sealants.

As an example of glass window panel and channeled frame compositions having the same thermal coefficient of expansion, a hard glass known as boro-silicate glass having a coefficient of expansion of $46 \times 10^{-7}$ inches per degree centigrade is composed of 80% $SiO_2$, 14% $B_2O_3$, 4% $Na_2O$ and 2% $Al_2O_3$. A metallic alloy having a matching coefficient of expansion of $47 \times 10^{-7}$ inches per degree centigrade and thus suitable for use as a frame material, is composed of 40.8% nickel, 58.93% iron, 0.03% silicon and 0.24% manganese.

As another example of glass window panel and channeled frame compositions having the same thermal coefficients of expansion, common soda-lime window glass having a coefficient of expansion of $92 \times 10^{-7}$ inches per degree centigrade is composed of 72% $SiO_2$, 15% $Na_2O$, 9% CaO, 3% MgO and 1% $Al_2O_3$. A metallic alloy having a matching coefficient of expansion of $92 \times 10^{-7}$ inches per degree centigrade and thus suitable for use as a frame material, is composed of 30.14% nickel, 67.73% iron, 0.02% silicon, and 0.11% manganese.

Figure 3:
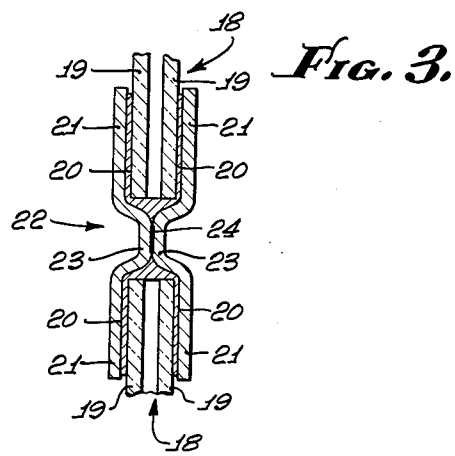
FIG. 3 is an enlarged cross section through another and modified joint for multiple windows.

Referring to FIG. 3, the window panels 18 illustrated, are each in the form of a sheet assembly including a pair of parallel spaced apart glass sheets 19 which are respectively bonded by the adhesive 20 to the strip flanges 21. The space between the glass sheets 19 may be evacuated or may contain a gas such as air to form a highly heat insulative assembly.

While the composite frame 22 illustrated forms two channel shaped sections, the strip flanges 21 at the same sides of the multiple window panels 18 are integral, and have a common extension 23 which is offset from the common plane of the strip flanges 21, the two offsets 23 being joined as by welding at 24 to form the U-shaped channels shown. The strip flanges and offsets 23 may be very conveniently extruded or rolled, and thereafter joined to form the frame structure within which the window panels are retained.

Figure 4:
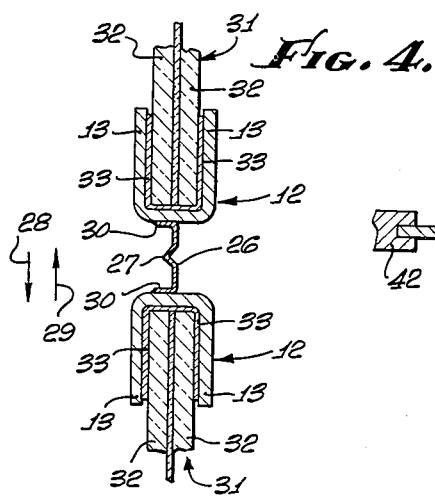
FIG. 4 is an enlarged cross section through still another multiple joint.

Referring now to FIG. 4, the U-shaped channel frames 12, each including strip flanges 13 are interconnected by a frame web 26, which is corrugated at 27 to accommodate relative movement of the oppositely projecting or extending channels toward and away from one another, as indicated by the arrows 28 and 29. The frame web 26 may be of the same metallic composition as the channels but normally will be of a different and less expensive metallic composition such as carbon steel. Web flanges 30 are fastened to the channels at their bases as by welding, brazing, soldering or adhesive bonding.

In the example shown in FIG. 4, the window panels 31 each include a pair of parallel spaced apart glass sheets 32 which are respectively bonded by the adhesive or sealant 33 to the strip flanges 13, the adhesive or sealant preferably comprising an epoxide resin but may comprise an inorganic material such as described in the introduction. As is characteristic of all forms of the invention, the frame channels and the glass panels have essentially the same temperature coefficient of expansion.

Figure 5:
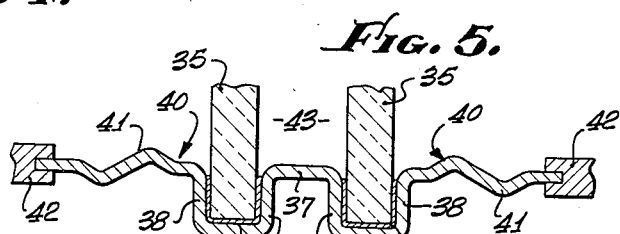
FIG. 5 is an enlarged cross section through an additional modified window and frame joint.
Figure 2:
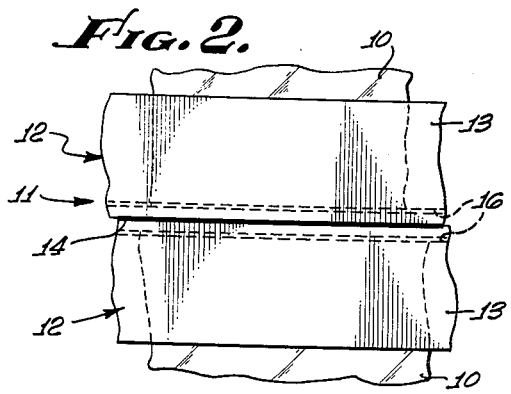
FIG. 2 is a front elevation of a multiple window and frame assembly.

In FIG. 5 a pair of glass panels 35 are shown as extending in parallel spaced apart relation, and as being mounted at their peripheries by frame channels 36 which are integrally joined by a web 37. The later is of the same composition as the channels and comprises a continuation of the strip flanges 38 at the inner sides of the glass panels 35. The adhesive bonding adjacent or sealant interposed between the glass panel and the channels 36 is illustrated at 39.

Extending outwardly away from the glass panels in opposite directions are continuations 40 of the outer strip flanges 38, these being corrugated at 41. The frame continuations 40 are typically joined to fixed mounting structure 42 as shown, the corrugations 41 accommodating temperature displacement of the frame and panel assembly relative to the fixed mounting structure 42. The channels 36 and web 37 extend completely about the peripheries of the glass panels, sealing off the space 43 therebetween. The latter space may be evacuated or may contain a gas such as air to form a highly heat insulative assembly.

Figure 6:
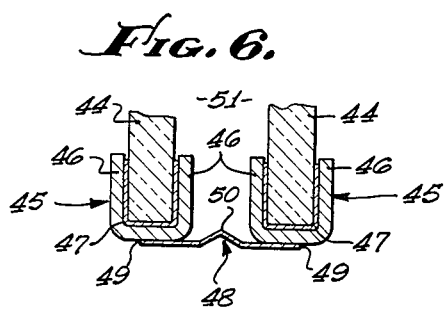
FIG. 6 is an enlarged cross section through the final modified form of the joint.

Referring finally to FIG. 6, a pair of glass window panels 44 are shown as extending in spaced apart parallel relation with their peripheries mounted by like U-shaped frame channels 45, including strip flanges 46 overlapping the inner and outer sides of the glass panels. Here again the frame channels and the glass panels have essentially the same temperature coefficient expansion, with the result that the sealant 47 or adhesive bonding adjacent intermediate the panels and channels is not ruptured and is therefore effective to hold pressure throughout wide temperature changes of the assembly.

The two channels 45 are shown as being joined together by a frame web 48 generally of a different composition from the channels, but nevertheless joined thereto as by the welding 49 shown. The web is corrugated at 50 to accommodate relative displacement of the glass panels and channels toward and away from one another in response to temperature changes. As in FIG. 5 the channels and web extend completely about the peripheries of the channels so that the space 51 therebetween is sealed off, and may be evacuated or may contain gas such as air for heat insulation.

Glazing of many different types of apparatus may be improved by or through utilization of the temperature insensitive and leak proof window and frame joint or joints as described. For example, windows in underwater equipment, as for example, aquariums may be so mounted. Other applications include periscopes, automobile windshields, vacuum furnaces, windows on aircraft, vacuum chambers, windows in kitchen ranges or oven windows and office building windows.

We claim:

1. Temperature insensitive and fluid leak proof window and frame structure, comprising a pair of glass window panels at opposite outer faces of which differential fluid pressure conditions are adapted to exist, frame structure holding the panels in spaced apart relation and mounting the panels at the peripheries thereof, said frame structure including channels having pairs of strip flanges overlapping the panels at opposite sides thereof, and an adhesive comprising thermosetting synthetic resin bonding said strip flanges to peripheral face and edge portions of adjacent panels in fluid leak proof condition, said channels and panels having essentially the same temperature coefficient of expansion so as to preclude rupture of said adhesive and resultant fluid leakage through the joint structure in response to wide temperature changes of the joint, said channels comprising a metal alloy containing 35 to 54% iron, 25 to 45% nickel, 18 to 53% cobalt, and 9 to 10% chromium.

2. The invention as defined in claim 1 in which said resin comprises an epoxide material.

3. The invention as defined in claim 1 in which each window panel comprises a sheet assembly including a parallel pair of spaced apart glass sheets which are respectively bonded to said strip flanges by said adhesive.

4. The invention as defined in claim 3 in which said sheet assembly includes an organic plastic reinforcing sheet intermediate said glass sheets.

5. The invention as defined in claim 1 in which said channels are joined together in back to back relation with said strip flanges projecting oppositely.

6. The invention as defined in claim 1 in which said frame structure includes a separate web interconnecting said channels, said web being corrugated to accommodate relative movement of the channels.

7. The invention as defined in claim 6 in which said web is fastened to said channels and said web and channels have different metallic compositions and different thermal coefficients of expansion.

8. The invention as defined in claim 6 in which said panels extend in parallel spaced apart relation, and said channels and web extend completely about the peripheries of said panels to seal off the space therebetween.

9. Temperature insensitive and fluid leak proof window and frame structure, comprising a pair of glass window panels at opposite outer faces of which differential fluid pressure conditions are adapted to exist, frame structure holding the panels in spaced apart relation and mounting the panels at the peripheries thereof, said frame structure including channels having pairs of strip flanges overlapping the panels at opposite sides thereof, and an adhesive comprising a low melting point metal alloy bonding said strip flanges to peripheral face and edge portions of adjacent panels in fluid leak proof condition, said channels and panels having essentially the same temperature coefficient of expansion so as to preclude rupture of said adhesive and resultant fluid leakage through the joint structure in response to wide temperature changes of the joint, said channels comprising a metal alloy containing 35 to 54% iron, 25 to 45% nickel, 18 to 53% cobalt, and 9 to 10% chromium.

10. Temperature insensitive and fluid leak proof window and frame structure, comprising a pair of glass window panels at opposite outer faces of which differential fluid pressure conditions are adapted to exist, frame structure holding the panels in spaced apart relation and mounting the panels at the peripheries thereof, said frame structure including channels having pairs of strip flanges overlapping the panels at opposite sides thereof, and an adhesive composition containing asbestos and sodium silicate bonding said strip flanges to peripheral face and edge portions of adjacent panels in fluid leak proof condition, said channels and panels having essentially the same temperature coefficient of expansion so as to preclude rupture of said adhesive and resultant fluid leakage through the joint structure in response to wide temperature changes of the joint, said channels comprising a metal alloy containing 35 to 54% iron, 25 to 45% nickel, 18 to 53% cobalt, and 9 to 10% chromium.

References Cited in the file of this patent

UNITED STATES PATENTS

| | | |
|---|---|---|
| 2,122,453 | Clause | July 5, 1938 |
| 2,191,500 | Rosling | Feb. 27, 1940 |
| 2,512,996 | Bixler | June 27, 1950 |
| 2,589,064 | Drake | Mar. 11, 1952 |
| 2,708,774 | Seelen | May 24, 1955 |

FOREIGN PATENTS

| | | |
|---|---|---|
| 1,105,220 | France | Nov. 29, 1955 |

OTHER REFERENCES

Modern Plastics publication entitled "Epoxies—No Wonder!," October 1952, pages 82 and 91–94.